Patented Feb. 20, 1951

2,542,402

UNITED STATES PATENT OFFICE 2,542,402

SOLUTIONS OF CELLULOSE TRIACETATE

Russell P. Easton, Binghamton, N. Y., assignor to General Aniline & Film Corporation, New York, N. Y., a corporation of Delaware No Drawing. Application November 7, 1946, Serial No. 708,475

6 Claims. (Cl. 106—189)

This invention relates to solutions of cellulose triacetate containing from 61 to 62.5 per cent of combined acetic acid.

As is well-known, cellulose acetate is produced commercially in a number of grades which differ in their degree of acetylation. The term "cellulose triacetate" has been often used very loosely in the past in defining any cellulose acetate having a high acetic acid content or a high degree of esterification. Generally, however, this term refers to cellulose triacetates having a combined acetic acid content of about 58 per cent and which are acetone soluble. They are generally manufactured from a highly esterified material containing an acetic acid content of approximately 61 to 62.5 per cent (the form which is actually cellulose triacetate) by saponification or hydrolysis.

The highly esterified cellulose acetate (cellulose triacetate) has superior mechanical and water resistant properties as compared with partially hydrolyzed acetates. However, because of the poor solubility characteristics of cellulose triacetate, its use has been almost completely restricted to those applications where it can be heat formed, i. e., as a molding material where it remains permanently soft under heat and the mold must be cooled before the molded article is removed.

It is known that about 10 parts by weight of cellulose acetate with a combined acetic acid content of about 60 per cent is soluble in 45 parts by weight of a mixture of solvents such as methylene chloride with a lower aliphatic alcohol such as, for example, methyl alcohol or ethyl alcohol. Articles made from such solutions by casting are, however, too brittle for many uses. In order to overcome this undesirable characteristic, it has been proposed to add to such solutions prior to casting thereof, an amount of acetone below that at which the cellulose triacetate will precipitate from solution, i. e., about 45 per cent by weight of the solution. The concentration of the cellulose acetate in the solution to which 45 per cent by weight of acetone has been added is reduced from 18.18 per cent to about 10 per cent. Solutions containing cellulose acetate in concentrations greater than 10 per cent by weight in a mixture of solvents such as methylene chloride and ethyl alcohol are readily prepared, but are unsatisfactory for preparing sheets, since the sheets obtained are also brittle. Cellulose triacetate containing from 61 to 62.5 per cent of combined acetic acid is not appreciably soluble at room temperature in acetone nor in a methylene chloride-alcohol solution mixture.

It is also known that 10 per cent to about 20 per cent solutions of cellulose acetate can be prepared by swelling the cellulose triacetate with a solvent such as acetone, methyl ethyl ketone, ethyl or propyl formate, etc., freezing the swollen mixture at a temperature ranging from —45° C. to —70° C., and then stirring it until it reaches room temperature. This process, which is described in French Patent 785,036 and in United States Patent 2,362,182, is only effective, however, on cellulose acetate with a combined acetic acid content of 58 to 60 per cent, but does not solubilize cellulose triacetate with a combined acetic acid content of 61 to 62.5 per cent. Cellulose acetate solutions obtained by this process are unstable and become turbid, and finally gel within three days. The most reasonable explanation of this solvency effect is quite similar to that advanced for mixed solvents where neither of the components are themselves solvents. In all probability, acetone, as well as other ketones and esters, form association compounds with cellulose acetate at low temperatures, which are soluble in an excess of the solvent and gradually break down with age causing the dope (solution) to gel.

It is an object of the present invention to provide clear and stable solutions of cellulose triacetate containing from 61 to 62.5 per cent combined acetic acid.

Another object is to provide solutions of cellulose triacetate containing from 61 to 62.5 per cent combined acetic acid, which are not only clear, but stable and do not gel upon storage.

A further object is to provide a solvent combination for preparing said solutions.

Other objects and features of the present invention will become more apparent as the description proceeds.

The objects outlined above are accomplished by dissolving the cellulose triacetate, containing from 61 to 62.5 per cent combined acetic acid, in a solvent mixture consisting of an alkyl polyhalide having a boiling point not lower than 40° C., and ethylene chlorohydrin, with or without the presence of a normally liquid aliphatic, aromatic, or heterocyclic alcohol. By "normally liquid" is meant that the alcohol is liquid at room temperature, i. e., 20° C. The presence of alcohol in the mixture depends upon the per cent of the combined acetic acid in the cellulose triacetate and is used only with the lower acetates in the above range.

For cellulose triacetate of 61 per cent combined acetic acid, the solvent mixture consists of alcohol, a poly-halide, and ethylene chlorohydrin. For cellulose triacetate of 62.5 per cent combined acetic acid, the solvent mixture consists only of a poly-halide and ethylene chlorohydrin. Thus as the combined acetic acid value of the cellulose triacetate increases within said range, the ratio of ethylene chlorohydrin to alcohol also increases in a straight line until with a cellulose triacetate of 62.5 per cent combined acetic acid, the alcohol is eliminated. In other words, as the combined acetic acid value of the cellulose triacetate increases gradually from 61 to 62.5 per cent, the ratio of alcohol diminishes and the ethylene chlorohydrin content increases proportionally, so that when the combined acetic acid value of the cellulose triacetate is 62.5 per cent, the alcohol content is nil.

The most essential feature of my invention resides in the use of ethylene chlorohydrin as the principal solvent in the solvent mixture. For dissolving cellulose triacetate of 61 per cent combined acetic acid, 90 parts by weight of an alkyl polyhalide and 10 parts by weight of a 1:1 mixture of alcohol and ethylene chlorohydrin is the most effective solvent mixture. The ratio of cellulose triacetate is 1 part by weight of the triacetate to 4 parts by weight of the solvent mixture. In these ratios, dissolution of the cellulose triacetate takes place readily at room temperature. The solutions obtained are clear and fluid and do not gel after standing for a considerable period of time.

The most effective solvent mixture for dissolving cellulose triacetate of 62.5 per cent combined acetic acid is a mixture consisting of 90 parts by weight of an alkyl poly-halide and 10 parts by weight of ethylene chlorohydrin. The ratio of cellulose triacetate is 1 part by weight per 5 parts by weight of the solvent mixture. In these ratios, dissolution of the cellulose triacetate takes place at room temperature. The solutions obtained are clear and fluid and do not gel or become turbid after standing for several months.

As suitable examples of alkyl poly-halides having boiling points not lower than 40° C., may be mentioned, methylene chloride, ethylene chloride, 1.1-dichlorethane, 1.1.2-trichloroethane, 1.1.1-trichlorethane, and the like.

Suitable alcohols are, for example, methyl alcohol, ethyl alcohol, propyl alcohol, isopropyl alcohol, n-butyl alcohol, tert.-butyl alcohol, isobutyl alcohol, benzyl alcohol, 2-methyl-benzyl alcohol, 3-methyl-benzyl alcohol, 4-methyl-benzyl alcohol, furfuryl alcohol, tetrahydrofurfuryl alcohol, and the like.

In practicing the present invention, the cellulose triacetate and the solvent mixture is added to a vessel provided with a mechanical stirrer. The resulting mixture is maintained at room temperature for a time sufficient to permit the swelling and the dissolution of the cellulose triacetate by the solvent mixture to take place. Swelling of the cellulose triacetate by the solvent mixture occurs within a few minutes, and is accelerated slightly with an increase in temperature not exceeding 30° C. A temperature between room temperature and 30° C. is preferred since swelling and the dissolution of the cellulose triacetate by the solvent mixture takes place more rapidly and completely.

The following examples describe in detail the method for accomplishing the above objects, but it is to be understood that they are inserted merely for the purpose of illustration, and are not to be construed as limitative.

*Example I*

A solvent mixture consisting of 288 parts by weight of methylene chloride and 32 parts by weight of a 1:1 mixture of methanol and ethylene chlorohydrin was added to 80 parts by weight of cellulose triacetate having a combined acetic acid content of 61.2 per cent. This mixture was mechanically stirred and maintained at a temperature of 23½° C., for 4 hours. The solution obtained was clear and fluid.

*Example II*

Twenty-five parts by weight of cellulose triacetate, having a combined acetic acid content of 62.3 per cent, were added to a solvent mixture consisting of 109.8 parts by weight of methylene chloride and 12.2 parts by weight of ethylene chlorohydrin. This mixture was stirred and maintained at a temperature of 22° C., for 4½ hours. The resulting clear solution when cast upon a glass plate, after drying, gave a clear and uniform film.

Where flexibility of the cellulose triacetate, formed by the evaporation of the solvent mixture, is desired, plasticizers, or mixtures thereof, may be added directly to the solvent mixture prior to swelling, during the dissolution of the swollen triacetate at room temperature, or to the final fluid product. The ratio of plasticizers employed may vary from 8 to 20 parts by weight of cellulose triacetate. As examples of suitable plasticizers may be mentioned: triphenyl phosphate, dioctyl phthalate, dimethyl phthalate, dibutyl phthalate, diethyl phthalate, and the like.

*Example III*

Forty parts by weight of cellulose triacetate, having a combined acetic acid content of 61.2 per cent, were added to a solvent mixture consisting of 576 parts by weight of ethylene chloride and 64 parts by weight of a 1:1 mixture of propyl alcohol and ethylene chlorohydrin. To this mixture were then added 24 parts by weight of triphenyl phosphate and 8 parts by weight of dimethyl phthalate, and the mixture stirred and maintained at a temperature of 25° C., for 4 hours. The resulting solution, when cast upon a glass plate, and after drying, gave a clear, uniform and flexible film.

*Example IV*

Fifty parts by weight of cellulose triacetate, having a combined acetic acid content of 62.3 per cent, were added to 218.6 parts by weight of trichloroethane, and 24.4 parts by weight of ethylene chlorohydrin. To this mixture were then added 7.5 parts by weight of dioctyl phthalate and 2.5 parts by weight of diethyl phthalate. The mixture was stirred at room temperature until it became fluid. The resulting solution, when cast upon a glass plate, and dried, gave a clear, uniform, and flexible film.

While the present invention has been described in considerable detail with reference to preferred procedures, materials and uses, it is to be understood that the invention is not limited thereto, and that numerous variations may be made in the procedure herein described. Equivalent materials may be substituted, as for example, a mixture of any one of the alkyl poly-halides described above, as components in the solvent mixture for the highly esterified cellulose triacetate, may be employed. All such modifications and variations are within the scope of the invention as defined by the appended claims.

I claim:

1. A composition comprising cellulose triacetate having a combined acetic acid content of from 61 to 62.5%, a normally liquid alkyl polychloride of not more than 2 carbon atoms having a boiling point of not lower than 40° C., and a mixture of ethylene chlorohydrin and a normally liquid alcohol, said polychloride and said mixture being present in the ratio of 9 to 1, respectively.

2. A composition which consists of cellulose triacetate having a combined acetic acid content of 61.2%, and a solvent mixture consisting of methylene chloride, and a 1:1 mixture of methanol and ethylene chlorohydrin, said chloride and said mixture being present in the ratio of 9 to 1, respectively.

3. A composition which consists of cellulose triacetate having a combined acetic acid content of 61.2%, and a solvent consisting of ethylene chloride and a 1:1 mixture of propyl alcohol and ethylene dichloride in the ratio of 9 to 1, respectively.

4. A composition which consists of cellulose triacetate having a combined acetic acid content of 62.5% and a solvent mixture consisting of ethylene chloride and ethylene chlorohydrin in the ratio of 9 to 1.

5. A composition comprising cellulose triacetate having a combined acetic acid content of from 61 to 62.5% and a solvent mixture comprising ethylene chlorohydrin and a normally liquid alkyl polychloride of not more than 2 carbon atoms, having a boiling point of not lower than 40° C., and a normally liquid alcohol in direct proportion to the acetic acid content of the cellulose triacetate ranging from no alcohol for the 62.5% cellulose acetate to an amount of alcohol equal to the amount of chlorohydrin for 61% acetic acid content of cellulose triacetate, said alkyl polychloride being present in the ratio of 9 parts to 1 part of the ethylene chlorohydrin and alcohol mixture.

6. A composition comprising cellulose triacetate having a combined acetic acid content of from 61 to 62.5%, and a mixture of a normally liquid alkyl polychloride of not more than 2 carbon atoms having a boiling point of not lower than 40° C., and ethylene chlorohydrin in the ratio of 9 parts polychloride to 1 part chlorohydrin, said triacetate being present in the ratio of 1 part to 5 parts of said mixture.

RUSSELL P. EASTON.

REFERENCES CITED

The following references are of record in the file of this patent:

UNITED STATES PATENTS

| Number | Name | Date |
|---|---|---|
| 1,027,616 | Lindsay | May 28, 1912 |
| 1,041,114 | Lindsay | Oct. 15, 1912 |
| 1,384,188 | Goerner | July 12, 1921 |
| 1,607,516 | Edbrook | Nov. 16, 1926 |

FOREIGN PATENTS

| Number | Country | Date |
|---|---|---|
| 318,818 | Great Britain | Sept. 12, 1929 |